United States Patent
Morikawa et al.

(10) Patent No.: US 6,342,671 B1
(45) Date of Patent: Jan. 29, 2002

(54) OPTICAL ACTUATOR

(75) Inventors: Yasushi Morikawa; Masaaki Ichiki, both of Tsukuba (JP)

(73) Assignees: Agency of Industrial Science and Technology; Ministry of International Trade and Industry, both of Tokyo (JP)

( * ) Notice: Subject to any disclaimer, the term of this patent is extended or adjusted under 35 U.S.C. 154(b) by 0 days.

(21) Appl. No.: 09/692,193

(22) Filed: Oct. 20, 2000

(30) Foreign Application Priority Data

Nov. 15, 1999 (JP) ............................................. 11-324238

(51) Int. Cl.[7] .......................... H01L 41/08; H02N 1/00; H02K 41/02
(52) U.S. Cl. ........................ 136/291; 136/293; 310/309; 310/311; 310/357; 310/358; 310/365; 318/116; 318/135; 318/558; 359/321; 359/323; 252/62.9 R; 252/62.9 PZ
(58) Field of Search ................................. 136/291, 293; 310/309, 311, 357, 358, 365; 318/116, 135, 558; 359/321, 323; 252/62.9 R, 62.9 PZ

(56) References Cited

U.S. PATENT DOCUMENTS

| | | | | |
|---|---|---|---|---|
| 4,634,343 A | * | 1/1987 | Nakamats | 416/3 |
| 4,849,621 A | * | 7/1989 | Yanase et al. | 250/214 PR |
| 5,245,734 A | * | 9/1993 | Issartel | 29/25.35 |
| 5,262,695 A | * | 11/1993 | Kuwano et al. | 310/309 |
| 5,731,676 A | * | 3/1998 | Nakamats | 318/471 |

FOREIGN PATENT DOCUMENTS

| | | | |
|---|---|---|---|
| JP | 59-129591 | | 7/1984 |
| JP | 63-161879 | | 7/1988 |
| JP | 4-244790 | | 9/1992 |
| JP | 5-236768 A | * | 9/1993 |
| JP | 6-197559 A | * | 7/1994 |
| JP | 6-202009 | | 7/1994 |
| JP | 7-206600 | | 8/1995 |
| JP | 7-213077 A | * | 8/1995 |
| JP | 2000-267022 A | * | 9/2000 |

* cited by examiner

*Primary Examiner*—Alan Diamond
(74) *Attorney, Agent, or Firm*—Oblon, Spivak, McClelland, Maier & Neustadt, P.C.

(57) ABSTRACT

An optical actuator includes pairs of stators disposed parallel to each other with a stipulated gap between them, a mover disposed moveably within the gap, and a number of photovoltaic devices. The photovoltaic device has device electrodes on either end in the direction of polarization, each connected to one of the pair of stators. The voltage generated by the photovoltaic effect of the device is utilized to generate force that displaces the mover with respect to the stators by means of electrostatic force arising from the voltage.

5 Claims, 3 Drawing Sheets

OPTICAL ACTUATOR

BACKGROUND OF THE INVENTION

1. Field of the Invention

This invention relates to an optical actuator that uses the voltage generated by the photovoltaic effect of a lead zirconate titanate device (PZT system device) to generate electrostatic force and extract power as rotary motion or linear motion.

2. Description of the Prior Art

Conventional optical actuators that use PZT system devices generate displacement using the photostrictive effect, which is the cumulative effect of the photovoltaic effect and piezoelectric effect of PZT system devices.

Conventional optical actuators that use PZT system devices have problems in that the amount of their displacement is limited because they utilize the strain of the material itself, and their displacement is small even when using a bimorph structure or other magnifying mechanism. In addition, the extraction of rotary motion is also difficult.

The present invention is proposed in order to solve the problems with the aforementioned prior art, and its object is to provide an optical actuator that is able to use light as its input and extract a large amount of displacement as output in the form of rotary motion or linear motion.

SUMMARY OF THE INVENTION

In order to achieve the object, the optical actuator according to this invention comprises a pair of stators disposed parallel to each other with a stipulated gap between them, a mover disposed moveably within the gap, and a device having a photovoltaic effect; wherein the device having a photovoltaic effect has a device electrode in one direction of polarization connected to one stator of the pair of stators, and a device electrode in the other direction of polarization connected to the other stator of the pair of stators, and a voltage generated by the photovoltaic effect of the device is utilized to generate force that displaces the mover with respect to the pair of stators by means of electrostatic force arising from the voltage.

The stator may consist of a plurality of stators disposed upon a stator disk at equal intervals in the peripheral direction, the mover consists of a plurality of rotors disposed upon a rotor disk at equal intervals in the peripheral direction, the intervals between the stators and the intervals between the rotors are varied in disposition, and the rotor disk is able to rotate coaxially with respect to the stator disk.

In addition, the stator may also consist of a plurality of stators disposed upon a stator plate at equal intervals, the mover consists of a plurality of movers disposed upon a mover plate at equal intervals, the intervals between the stators and the intervals between the movers are varied in disposition, and the mover plate is able to move linearly with respect to the stator plate.

The device having a photovoltaic effect may be a PZT system device, a lithium niobate device or a polyvinylidene fluoride copolymer device.

With the optical actuator according to the present invention, it is possible to increase the amount of force generated and the displacement rate by increasing the numbers of stators and movers or providing a structure with multiple elements.

The optical actuator according to the present invention utilizes not only the photoelectric effect of a device having a photoelectric effect but also electrostatic force, so a large displacement can be extracted in rotary motion or linear motion.

The above and other objects and features of the invention will become apparent from the following description made with reference to the accompanying drawings.

DESCRIPTION OF THE PREFERRED EMBODIMENTS

Figure 1:
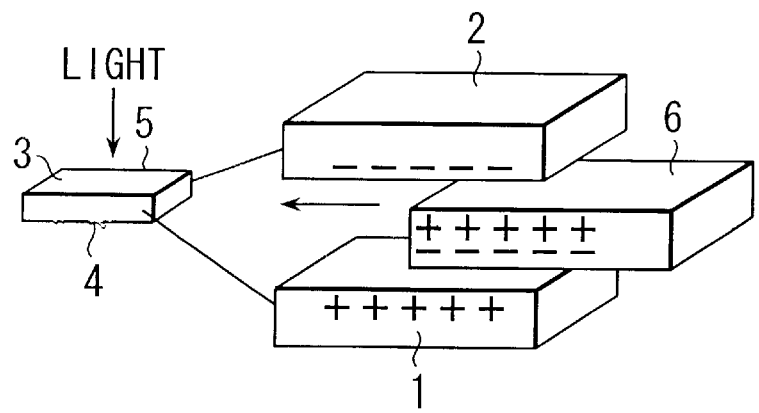
FIG. 1 is a diagram showing the fundamental structure of the optical actuator according to the present invention which generates electrostatic force upon irradiation with light.

Here follows a description of an embodiment of the working of the optical actuator according to the present invention made with reference to drawings based on Working Examples. FIG. 1 is an explanatory diagram showing the fundamental structure of the optical actuator according to the present invention. Two stators 1 and 2 of the same shape made of copper or other metallic conducting material are disposed such that they are mutually parallel. PZT system device electrodes 4 and 5 on either end of a PZT system device 3 in the direction of polarization are each electrically connected to the stators 1 and 2, respectively.

Between this pair of stators 1 and 2 a mover 6 made of copper or other metal or silicon or other dielectric material is disposed parallel to the stators 1 and 2. This mover 6 is disposed parallel to the stators 1 and 2 and is supported appropriately by a sliding bearing or the like (not shown) such that it is able to move in a direction parallel to the stators 1 and 2.

As shown in FIG. 1, the mover 6 is placed in a state such that it overlaps a portion of the stators 1 and 2 and then the PZT system device 3 is irradiated with light. This irradiation with light causes a current to flow in the interior of the PZT system device due to the photovoltaic effect, so positive and negative electric charges accumulate on the stators 1 and 2, and thus a voltage is generated between the stators 1 and 2. At this time, the side surfaces of the mover 6 made of a dielectric material facing the positive-side stator 1 and the negative-side stator 2 are polarized negatively and positively.

As a result, electrostatic force acts between the mover 6 and the stators 1 and 2 in the direction toward the mover 6 overlapping the stators 1 and 2, and thus a driving force arises in the mover 6. Note that when the irradiation with light ceases, the voltage induced by the photovoltaic effect dissipates gradually and the voltage drops. If the PZT system device is replaced by a lithium niobate device (LN device) or polyvinylidene fluoride copolymer device (PVDF device) or other device that exhibits the photovoltaic effect, the same action will occur.

Figure 2:
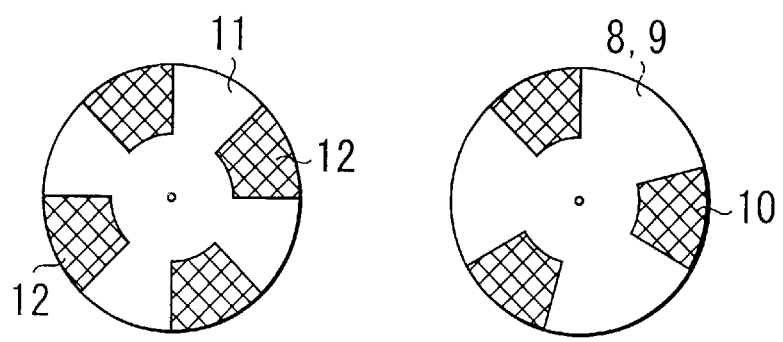
FIG. 2 is a diagram showing the layout of the stator and rotor of the rotary-type optical actuator according to Working Example 1 of the present invention.
Figure 3:
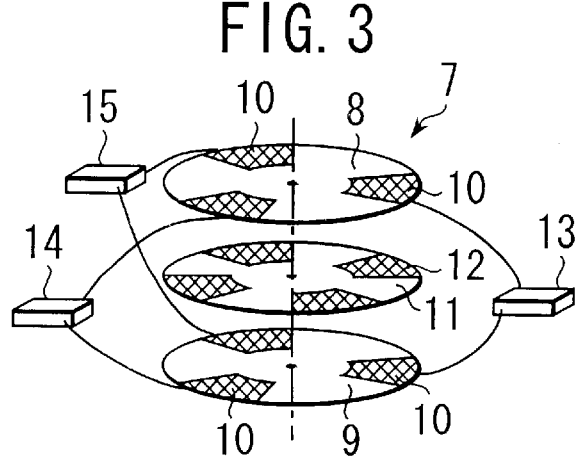
FIG. 3 is a schematic diagram of the overall structure of the optical actuator of FIG. 2.

FIGS. 2–4 show a rotary-type optical actuator that extracts rotary motion due to the photovoltaic effect, as Working Example 1 of the optical actuator according to the present invention. This rotary-type optical actuator 7 consists of two stator disks 8 and 9 disposed parallel to each other (above and below) with a stipulated gap between them. Each of the stator disks 8 and 9 consists of a set of three stators 10 made of the same conducting material as that of the aforementioned stators 1 and 2 disposed at equal intervals in the peripheral direction.

A rotor disk 11 is disposed between and parallel to these stator disks 8 and 9. The rotor disk consists of a set of four rotors 12 made of the same dielectric material as that of the aforementioned mover 6 disposed at equal intervals in the peripheral direction. In the case of this Working Example 1, as shown in FIG. 2, three sets of stators 10 of the same width as the rotors 12 are provided, numbering one fewer than the number of rotors 12.

These stator disks 8 and 9 and the rotor disk 11 are disposed coaxially as shown in FIG. 3 and the three sets of stators 10 are each connected to the device electrodes at either end of PZT system devices 13, 14 and 15 in the direction of polarization.

Figure 4A:
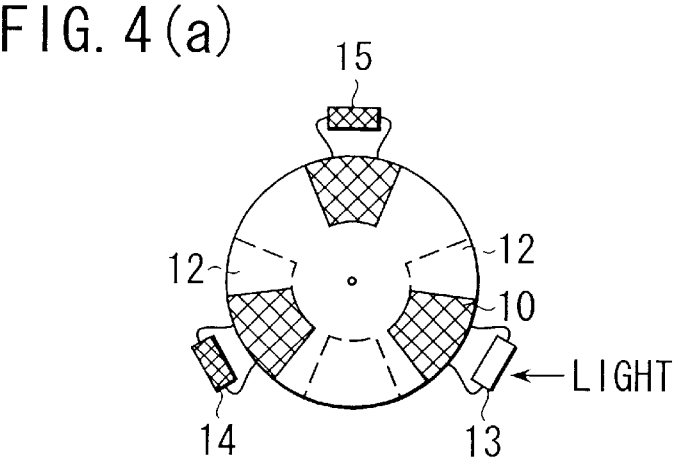
FIGS. 4(*a*), 4(*b*) and 4(*c*) are diagrams used to explain the operation of the rotary-type optical actuator of FIG. 2.
Figure 4B:
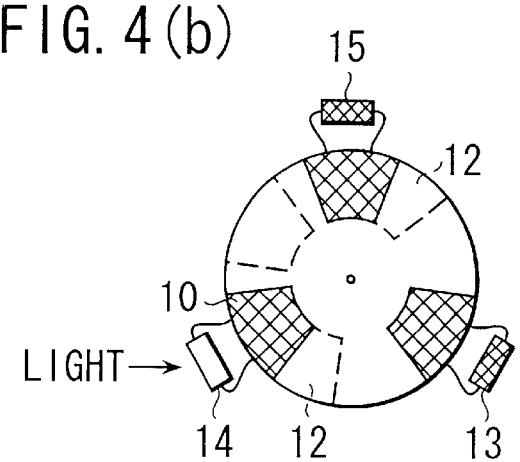

Here follows a description of the working of the rotary-type optical actuator 7 according to Working Example 1 having such a constitution, made with reference to FIG. 4. When the stators 10 and rotors 12 are in the positional relationship as shown in FIG. 4(a) wherein a rotor 12 is present between the stators 10 connected to PZT system device 15, among the PZT system devices 13–15, if only the PZT system device 13 at the bottom right is illuminated with light, then a force is generated such that the rotor at the bottom right moves to overlap the stators, and thus the rotors 12 rotate clockwise until the positional relationship shown in FIG. 4(b) results.

Figure 4C:
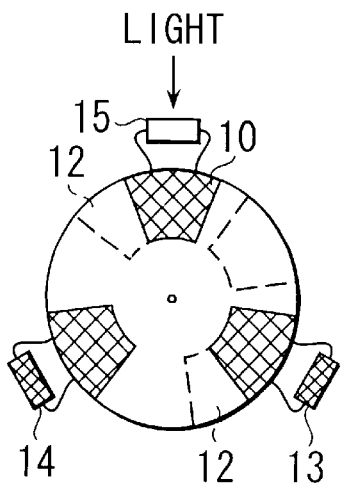

Next, if only the PZT system device 14 at the bottom left is illuminated with light, then a force is generated such that the rotor 12 at the bottom left moves to overlap the stators 10, thus rotating until the positional relationship shown in FIG. 4(c) results. And next, if only the PZT system device 15 at the top is illuminated with light, then the rotor 12 at the top moves to overlap the stators 10, resulting in the positional relationship shown in FIG. 4(a). If the illumination of PZT system devices with light in order is repeated at appropriate time intervals in this manner, it is possible to generate rotary motion by repeating these three steps.

Note that in the aforementioned Working Example, three stators 10 are provided upon the stator disk 8 and four rotors 12 are provided on the rotor disk 11, but it is sufficient for, when one rotor is positioned to completely overlap a pair of stators, at least one of the remaining rotors to be at a position where it does not overlap a stator at all, and thus it is possible to control the amount of force generated and the displacement rate by increasing the numbers of stators and rotors or providing multiple coaxial stator disks and rotor disks.

Figure 5:
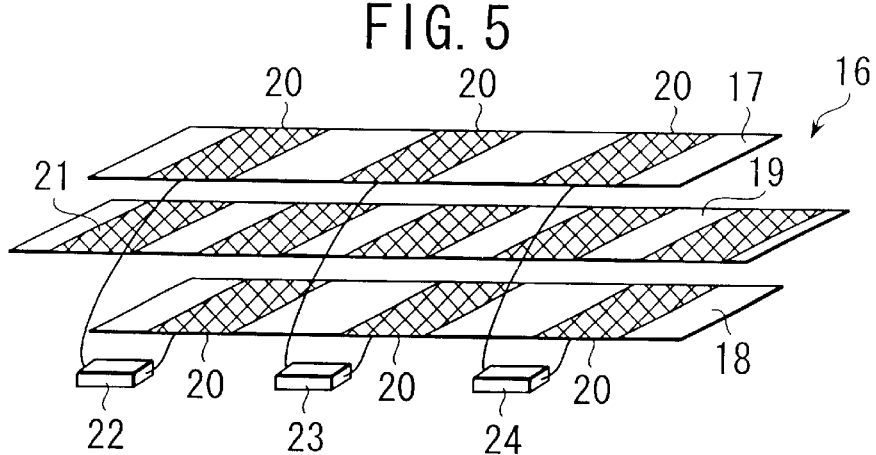
FIG. 5 is a diagram showing the layout of the stator and mover of the linear-type optical actuator according to Working Example 2 of the present invention.

FIGS. 5–6 show a linear-type optical actuator that extracts linear motion due to the photovoltaic effect, as Working Example 2 of the optical actuator according to the present invention. This linear-type optical actuator 16 consists of two stator plates 17 and 18 disposed parallel to each other (above and below) with a stipulated gap between them. A mover plate 19 is disposed between these upper and lower stator plates 17 and 18 such that the mover plate 19 lies parallel to and sandwiched between the stator plates 17 and 18.

Three stators 20 are disposed at equal intervals upon each of the stator plates 17 and 18, and five movers 21 are disposed at equal intervals upon the mover plate 19. As shown in FIG. 6, stators 20 of the same width as the movers 21 are disposed at an interval of 5/3 times the width of the stator. Furthermore, the two sets of three stators 20 are each connected to the device electrodes at either end of PZT system devices 22, 23 and 24 in the direction of polarization.

Here follows a description of the working of the linear-type optical actuator 16 according to Working Example 2 having such a constitution. When the stator plates 17 and 18 and the mover plate 19 are in the positional relationship shown in FIG. 6(a) wherein a mover 21 is present between the stators 20 connected to PZT system device 24, if only the PZT system device 22 on the left side is illuminated with light, then a force is generated such that the mover 21 on the left side moves to overlap the stators 20, and thus the mover plate 19 moves to the positional relationship shown in FIG. 6(b).

Figure 6A:
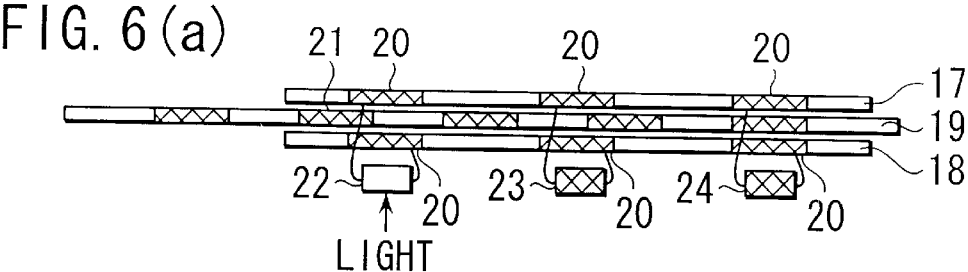
FIGS. 6(*a*), 6(*b*), 6(*c*) and 6(*d*) are diagrams used to explain the operation of the linear-type optical actuator of FIG. 5.
Figure 6B:
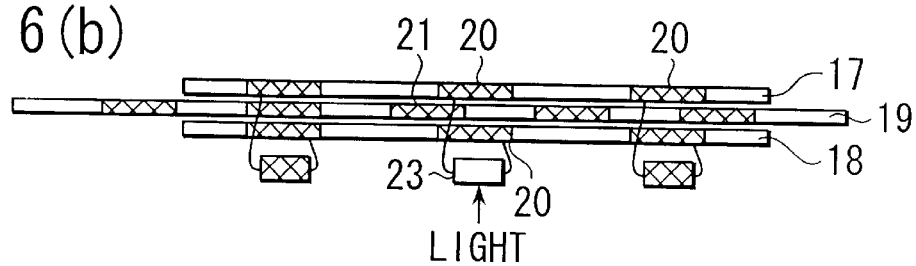
Figure 6C:
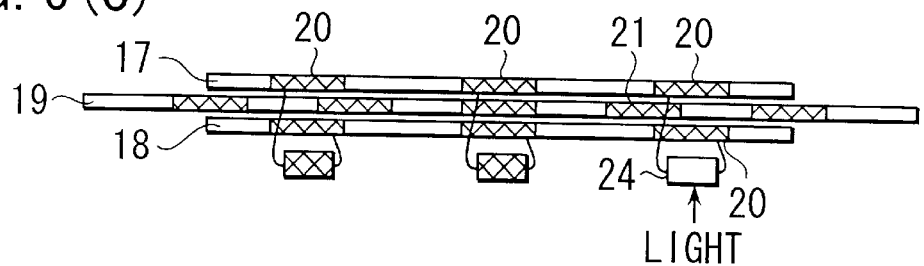

Next, if only the PZT system device 23 in the center is illuminated with light, then a force is generated such that the mover 21 moves to overlap the stators 20 in the center so the mover plate 19 moves to the positional relationship shown in FIG. 6(c).

Figure 6D:
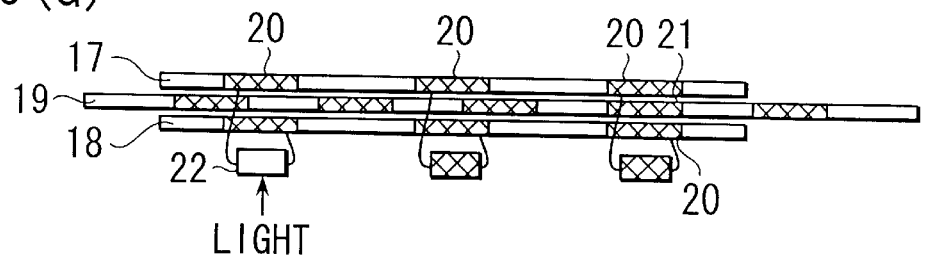

Moreover, if now only the PZT system device 24 on the right side is illuminated with light, then the mover 21 moves to overlap the stators 20 on the right side so the mover plate 19 moves to the positional relationship shown in FIG. 6(d). By providing a large number of movers 21 upon the mover plate 19, the mover plate 19 can be moved in a straight line. In addition, movement in the reverse direction is also similarly possible.

Note that in the aforementioned Working Example, three stators 20 are provided upon the stator plate 18 and five movers 21 are provided on the mover plate 19, but it is possible to increase the amount of force generated and the displacement rate by increasing the numbers of stators and movers or providing multiple stator plates and mover plates with matched directions of displacement.

Here follows a description of an example of an experiment performed with the rotary-type optical actuator of the present invention.

A rotor disk 100 mm in diameter was rotatably supported between a pair of stator disks 100 mm in diameter as shown in FIG. 3. The gap between rotor disk and stator disk was 0.5 mm. As shown in FIG. 2, three copper stators were provided upon each of the stator disks, and similarly, four copper rotors were provided upon the rotor disk. Each of the stators of the pair of stator disks is connected to a 10×10×0.5 mm PLZT device which, when one of the devices is irradiated with ultraviolet light with an intensity of 200 mW/cm², results in rotation of approximately 9 degrees in approximately 3 seconds from the start of irradiation.

Judging from the ideal amount of force generated, the aforementioned results are thought to have occurred due to a large portion of the electrostatic force being cancelled by friction force in the bearing that supports the rotor disk.

The optical actuator according to the present invention was described above with two Working Examples, but the present invention is in no way limited to these Working Examples and it need not be said that various other modes of working are possible as long as they are within the scope of the appended claims.

The present invention has the aforementioned constitution, so by taking advantage of the photovoltaic effect and electrostatic force of a PZT system device or other device having a photovoltaic effect, it is possible to extract a large displacement as rotary motion or linear motion from an extremely simple structure.

Moreover, with the actuator according to the present invention, it is possible to supply energy by light in a non-contact manner, and it is also easy to control the rotary motion or linear motion extracted, so it can be utilized as the source of motive power for micromachines or as the source of motive power for machines that are isolated inside a glass case or the like.

What is claimed is:

1. An optical actuator comprising:
   a pair of stators made of conducting material disposed parallel to each other with a stipulated gap between them,
   a mover made of dielectric material disposed moveably within said gap, and
   a device having a photovoltaic effect;
   wherein said device having a photovoltaic effect has a device electrode in one direction of polarization connected to one stator of said pair of stators, and a device electrode in the other direction of polarization connected to the other stator of said pair of stators, and
   at a time of irradiation with light, a voltage generated by said device having a photovoltaic effect is utilized to generate force that displaces the mover with respect to said stators by means of electrostatic force arising from said voltage.

2. The optical actuator according to claim 1, wherein each of said stators consists of a plurality of stators disposed upon a stator disk at equal intervals in a peripheral direction, said mover consists of a plurality of rotors disposed upon a rotor disk at equal intervals in a peripheral direction, the intervals between said stators and the intervals between said rotors are varied in disposition, and said rotor disk is able to rotate coaxially with respect to the stator disk.

3. The optical actuator according to claim 1, wherein each of said stators consists of a plurality of stators disposed upon a stator plate at equal intervals, said mover consists of a plurality of movers disposed upon a mover plate at equal intervals, the intervals between said stators and the intervals between said movers are varied in disposition, and said mover plate is able to move linearly with respect to the stator plate.

4. The optical actuator according to claim 1, wherein said device having a photovoltaic effect is a lead zirconate titanate device.

5. The optical actuator according to claim 1, wherein said device having a photovoltaic effect is a lithium niobate device or polyvinylidene fluoride copolymer device.

* * * * *